Jan. 23, 1951    R. G. DE FRIES    2,538,767
REMOVABLE CAR CRIB
Filed Oct. 26, 1948
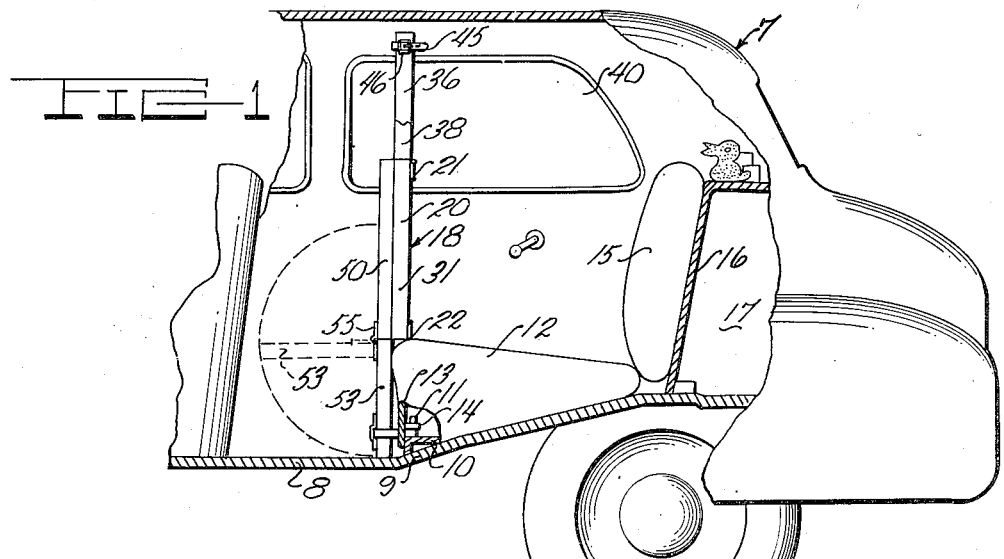
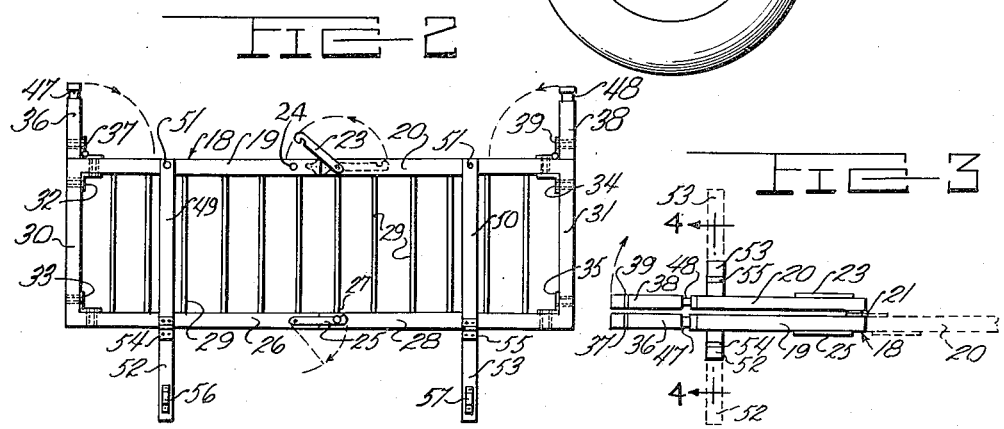
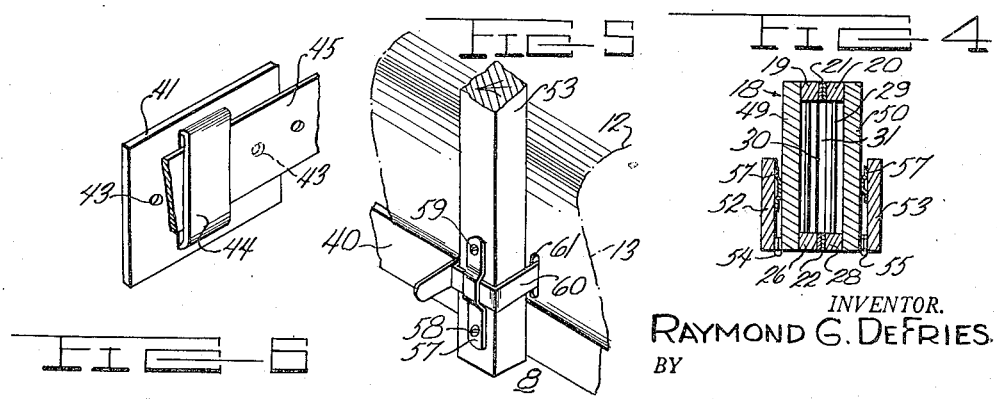
INVENTOR.
RAYMOND G. DeFRIES
BY
McMorrow, Berman & Davidson
ATTORNEYS Patented Jan. 23, 1951

2,538,767

UNITED STATES PATENT OFFICE 2,538,767

REMOVABLE CAR CRIB

Raymond G. De Fries, Melvin, Ill.

Application October 26, 1948, Serial No. 56,513

3 Claims. (Cl. 5—94)

1

This invention relates to attachments for automobile seats, and particularly to a removable crib attachment for the rear seat of a car.

The main object of my invention is to provide an automobile with a crib wall or attachment adjacent to the front edge of the rear seat thereof to serve as a fence or retaining wall which converts the entire rear seat into a crib for an infant.

Another object is to provide an automobile with a crib attachment of the character indicated which is rigidly fixed in position for use when set up, and yet is easily and quickly removed at will.

A further object is to have such a removable crib attachment which is also collapsible into small and conveniently-handled form capable of being stored or stowed away in a portion of the rear trunk compartment of the car involved.

It is also an object to have such a crib attachment made of wood or metal in simple yet effective and durable form.

A practical object is, of course, to manufacture a crib attachment as indicated at low cost so that it may be offered to the public at a reasonable figure.

Other objects and advantages of the invention will appear in further detail as the specification proceeds.

In order to facilitate ready comprehension of this invention for a proper appreciation of the salient features thereof, the invention is illustrated on the accompanying drawing forming part hereof, and in which:

Figure 1 is a fragmentary section of a rear portion of an automobile illustrating a removable car crib made according to the invention and embodying the same in a practical form which is shown in side elevation;

Figure 2 is a front elevation of the same car crib attachment, as seen from the left in Figure 1, and removed from the car;

Figure 3 is a top or plan view of the crib attachment when folded together or collapsed for stowing it away;

Figure 4 is a section taken on line 4—4 in Figure 3;

Figure 5 is a fragmentary perspective view of the lower portion of one of the supporting posts of the crib attachment, the view being shown on an enlarged scale;

Figure 6 is a perspective view of an attachment plate for the upper end of the removable crib disposed at each side of the car above the front edge of the rear seat thereof.

2

In the various views, the same reference numerals indicates the same or like parts.

When a small child is taken along upon an automobile ride, especially if an infant, the rear seat of the car involved is frequently used as a bed for the child and appears to be the most logical place for his bed. However, as the car is not still and also must make turns as well as start and stop and likewise encounters irregularities in the road traveled, the child can all too often be jolted or swung out of place, and in fact thrown on the floor upon occasion with possible injury resulting therefrom.

Upon considering this problem, it has occurred to me that a detachable retaining fence or crib wall should be available to prevent accidental displacement of an infant from the rear seat and thereby eliminate the danger of falling forward onto the floor of the car. As a result, I have found it quite feasible to produce a removable car crib as already outlined which will now be more fully explained.

Hence, in the practice of my invention, and referring again to the drawing, in an automobile generally indicated at 7, the floor 8 has a rearwardly-extending portion 9 upon which is mounted a transverse member 10 having an upwardly-projecting stud 11 at each side. Located upon the rearwardly-extending floor portion 9 is a rear cushion 12 having a downwardly-extending front portion or apron 13 provided with a pair of rearwardly directed loop or eye members 14 normally engaging upon and about studs 11 in order to fix the cushion in position. In conventional manner the rear back cushion 15 rests against the front wall 16 of a trunk compartment 17 and for the purpose of the invention forms the rear wall of the crib, and upon the front edge of the rear seat 12 is vertically mounted a crib structure, generally indicated at 18 primarily consisting of a pair of crib frames 19 and 20 hinged together at their junctions by hinges 21, 22 at the lower and upper edges thereof. Viewing Figure 2, the hinges are concealed upon the rear of the frame members 19 and 20, but upon the forward portions of the upper frame members are located a hook 23 pivoted on frame 20 and a corresponding stud 24 on frame 19 with which the hook is adapted to engage in order to retain frames 19 and 20 aligned and prevent buckling thereof upon the hinges, as well as a lower hook 25 secured upon the lower frame portion 26 of frame 19, while the corresponding stud 27 is fixed upon the lower frame member 28 of frame 20. Between the upper and lower portions of the frames extend a series of rungs 29, 29 spaced apart and occupying the space between the upper and lower frame members, while at the outer ends the frames terminate in a pair of upright end members 30, 31 forming the outer ends of frames 19 and 20. The end member 30 is secured by angles 32, 33 to the upper and lower portions of frame 19, while in similar fashion the other end member 31 is secured by angles 34, 35 to the upper and lower frame members of frame 20. Above end member 30 and in line therewith is a fold-down end post 36 connected to frame 19 by means of a hinge 37, and in similar fashion an upright end post 38 is connected by a second hinge to the upper portion of frame 20 by a hinge 39 in such fashion that when it is erected it is in line with end member 31 of said frame 20. The mentioned posts 36 and 38, when erected into their upright positions, extend above the window 40 of the automobile and at both sides of the latter engage against a pair of side loop plates (one shown at 41 in Figure 6), each plate being secured by a pair of screws or the like in holes 42, 43 and provided with a strap loop 44 through which a strap 45 extends, being provided with a buckle 46. Upon each side of the interior of the car the strap 45 engaged by the loop 44 in loop plate 41 engages in a flat groove 47 in post 36 or 48 in post 38, thereby anchoring the two posts 36 and 38 to the sides and holding the two aligned frames 19 and 20 rigidly upright.

In order to support the frames so that the same may rest upon the floor 8 of the car, a pair of vertical reinforcing bars 49, 50 are secured at their upper and lower ends to the upper and lower portions of frames 19 and 20 by means of screws or bolts 51, 51, etc., and at the lower ends these members 49 and 50 are provided with individual fold-down extensions or legs 52, 53 connected to said members 49 and 50 by means of hinges 54, 55 in such fashion that the legs 52 and 53 may be folded upwardly out of the way when the crib structure is to be collapsed and stored away. Upon the lower forward surfaces of the hinged legs 52 and 53 loop strap guards or retainers 56 and 57 are fixed upon the legs by means of screws or bolts 58, 59, for example, these legs serving to stand upon floor 8 and directly support reinforcing members 49 and 50 and thereby the entire frame 18. In order to stabilize the legs 52 and 53, each is held in position, as best seen in Figure 5, by means of a strap 60 which is passed through slots 61 in the lower portion or apron 13 of rear seat 12 and about stud 11 beneath the loop or apertured lug 14 adjacent to the leg, the strap being passed through the guide loop 56 or 57, as the case may be, in such fashion as to envelop the leg at each side and which obviously prevents the legs 52 and 53 when thus secured from buckling or folding upward upon their hinges 54 and 55 until the strap 60 in each case is released.

When the entire crib frame or structure 18 is thus erected as described, the lower legs 52 and 53 support the structure on the floor 8, while being held in position beneath seat 12, and at the same time, the upper end posts 36 and 38 are held by straps 45 anchored in the loop portions 44 of loop plates 41 above the windows in both sides of the car, and as the hooks 23 and 25 hold the two frame sections 19 and 20 rigidly in line, the whole presents a rigid fence or crib structure preventing accidental displacement of an infant from the seat 12 onto the floor 8, even if the automobile be violently shaken.

When it is desired to remove the crib structure 18 and store it away in the rear trunk compartment 17, for example, it is but necessary to release the straps 45 at the top and fold down posts 36, 36 on frames 19 and 20, as shown in Figure 3, then hooks 23 and 25 are released from studs 24 and 27, respectively, straps 60 also released from guide loops 56 and 57 on legs 52 and 53, and the legs folded up outside of reinforcing members 49 and 50, when the frames 19 and 20 may be folded upon hinges 21 and 22 into the doubled relation shown in Figures 3 and 4, when the entire frame is collapsed in such compact condition as to be readily placed into compartment 17 already referred to.

The frame sections, posts, legs and reinforcing members above the legs may be made of wood, metal or even plastic material if so desired.

Manifestly, variations may be resorted to and parts and features may be modified or used without others within the scope of the appended claims.

Having now fully described my invention, I claim:

1. A removable crib attachment for the rear seat of an automobile having a floor and sides, said attachment comprising a folding frame including two frame sections hinged together to fold in superposed relation about a vertical axis, hooks upon the frame sections for bridging the junction thereof and corresponding studs for retaining said frame sections aligned, a pair of upwardly-extending end posts secured upon the outer ends of said frame sections, a pair of depending supporting legs extending downward from the lower portions of the frame sections, means for securing the depending supporting legs in position on the floor of the automobile with the frame sections in contact with the front portion of the rear seat, and means for securing the upper ends of said end posts to the sides of the automobile.

2. A removable crib attachment for the rear seat of an automobile having a floor and sides, said attachment comprising a folding frame including two frame sections hinged together to fold in superposed relation about a vertical axis, hooks upon the frame sections for bridging the junction thereof and corresponding studs for retaining said frame sections aligned, a pair of upwardly-extensible end posts hinged upon the outer ends of said frame sections and adapted to be erected from a folded-down position on the latter, a pair of strap loops secured to the sides of the automobile above the seat, a pair of straps engaging inside said strap loops and serving to envelop the upper ends of said end posts, a pair of supporting legs connected to the lower portions of said frame sections in position to be directed down to the floor of a car, a pair of attachment members beneath the rear seat, and a pair of straps for enveloping the lower portions of said supporting legs and connecting them securely with said attachment members beneath said rear seat to stabilize said legs on the floor and retain the frame sections in position at the forward portion of said rear seat.

3. A removable crib attachment for the rear seat of an automobile having a floor and sides, said attachment comprising a folding frame including two frame sections hinged together to fold together in superposed relation about a vertical axis, hooks upon the frame sections for bridging the junction thereof and corresponding studs for retaining said frame sections aligned, a pair of upwardly-extensible end posts hinged upon the outer ends of said frame sections and adapted to be erected from a folded-down position on the latter, a pair of strap loops secured to the sides of the automobile about the seat, a pair of straps engaging inside said strap loops and serving to envelop the upper ends of said end posts, a pair of supporting legs hinged to the lower portions of said frame sections in position to be directed down to the floor of the car, a pair of rigidly attached reinforcing members upon said frame sections disposed above said supporting legs and when the latter are lowered also disposed in line therewith, a pair of attachment members fixed beneath the forward portion of the rear seat, and a pair of straps for enveloping the lower portions of said supporting legs and connecting them securely with said attachment members to stabilize said legs on the floor and retain the frame sections in position at the forward portion of said rear seat.

RAYMOND G. DE FRIES.

REFERENCES CITED

The following references are of record in the file of this patent:

UNITED STATES PATENTS

| Number | Name | Date |
|---|---|---|
| 194,266 | Rope | Aug. 14, 1877 |
| 208,721 | Diescher | Oct. 8, 1878 |
| 238,282 | Gibson | Mar. 1, 1881 |
| 1,926,220 | Xiques | Sept. 12, 1933 |
| 2,048,955 | Showalter | July 28, 1936 |
| 2,195,955 | Hillenbrand | Apr. 2, 1940 |